Jan. 25, 1955

L. S. LYNCH, JR 2,700,723

ELECTRIC FOOD HEATER

Filed Jan. 11, 1952

INVENTOR.
LESLIE S. LYNCH JR.
BY
Louis V. Lucia
ATTORNEY.

Jan. 25, 1955

L. S. LYNCH, JR 2,700,723

ELECTRIC FOOD HEATER

Filed Jan. 11, 1952

INVENTOR.
LESLIE S. LYNCH JR.
BY
*Louis V. Lucia*
ATTORNEY.

United States Patent Office 2,700,723
Patented Jan. 25, 1955

2,700,723

ELECTRIC FOOD HEATER

Leslie S. Lynch, Jr., Bogota, N. J., assignor to Rudo Associates, Newark, N. J.

Application January 11, 1952, Serial No. 265,948

8 Claims. (Cl. 219—43)

This invention relates to an electric food heater and more particularly to a heater that is adapted for heating soups and other liquid or semi-liquid foods to a predetermined temperature.

It is an object of this invention to provide a heater that is particularly adapted for heating soups and the like in restaurants and at lunch counters.

A further object of my invention is to provide a heater having a container, in which the food is heated and automatic mechanism for uncovering the container and terminating the heating operation when the soup has been heated to a predetermined temperature.

A still further object of my invention is to provide a heater which will render a visual signal to indicate completion of the heating operation.

Further objects and advantages of this invention will be more clearly understood from the following description and the accompanying drawings in which.

Figure 1:
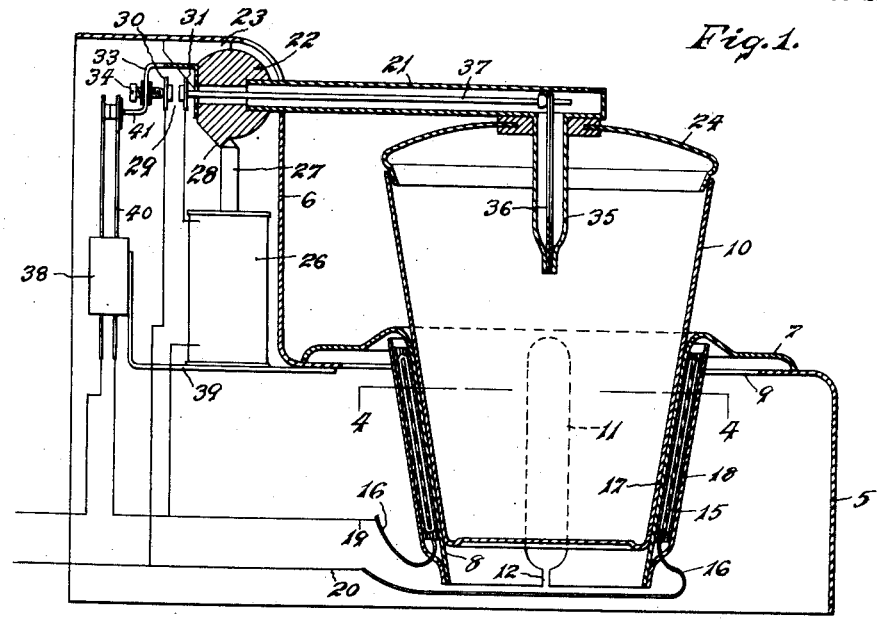
Fig. 1 is a side view, in central vertical section, of a food heater embodying my invention, the electric wiring for said heater being shown partly in diagrammatic form.

In the embodiment of my present invention which is illustrated in the drawings, my improved electric food heater preferably comprises a base 5 having a raised rear portion 6 for supporting parts of the operating mechanism.

A heating unit is supported upon the base 5 and the said unit preferably comprises a supporting shell having an annular supporting flange 7, which rests upon the top of the base 5, and an annular inner shell portion 8 which depends from the said supporting flange through an opening 9 in the top of the base 5. The said inner shell portion is preferably tapered downwardly and inwardly to receive a tapered container 10 in which is placed the liquid food material that is to be heated.

It has been found that the efficiency of the heater is materially increased when the container 10 and the inner shell 8 are formed in the shape of an inverted truncated cone having walls tapered inwardly in a downward direction, as illustrated in the drawings, since this provides a tighter contact between the wall of the container and the inner shell, and that the smaller the included angle of the sides, the tighter the contact and the higher the efficiency of the heater. However, because of such tapered surfaces, binding between the container and the shell may result if the included angle is too small, particularly when the inner shell cools around the outer surface of the container, and, in order to prevent such binding, the portion of the inner shell which contacts the container wall is preferably separated by a series of slots 11 that extend through the wall of the heating element and continue to the bottom of the inner shell through slits 12 which separate the said inner shell into portions that are sufficiently yieldable to prevent binding between the said container and inner shell.

An electric resistance element is provided which includes a plurality of separate sections disposed between flanges 13 that extend along the edges of adjacent slots 11 and the said sections are secured into contact with the outer surface of the inner shell by means of a surrounding outer shell 14 which is secured to said flanges.

Each section of the resistance element is preferably constructed of a core comprising a sheet 15 upon which is wound a resistance wire, indicated at 16. Insulating sheets or walls 17 and 18 are provided upon the opposite sides of said core to insulate the resistance wire from the said inner and outer shells in the conventional manner. The said sections of the heating element are united and connected within the electrical circuit of the heater by means of a pair of electric wires 19 and 20.

Figure 2:
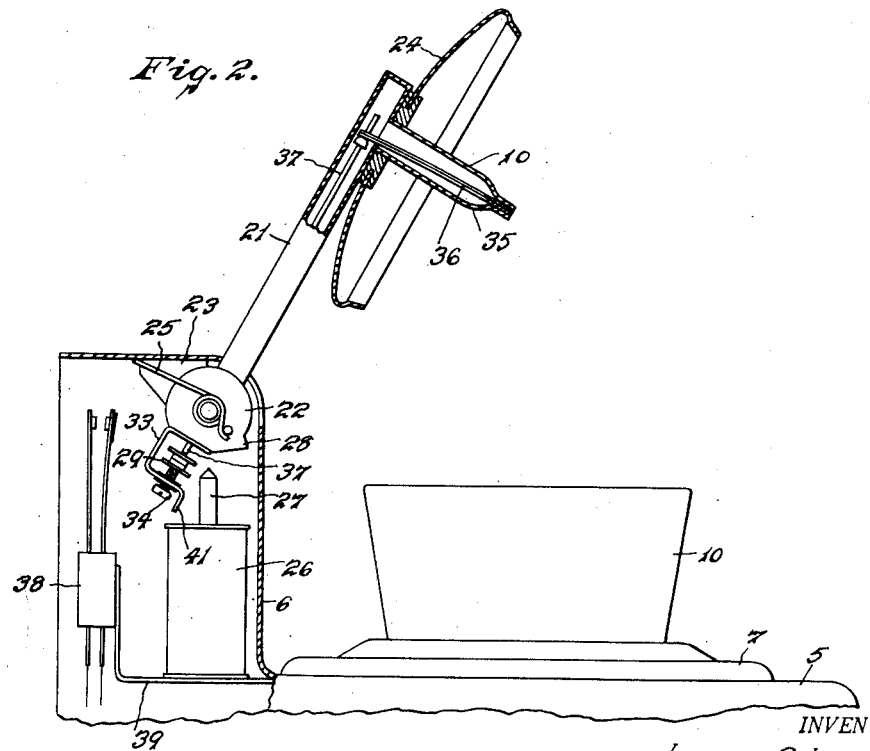
Fig. 2 is a side view in said heater, partly in central vertical section, illustrating the operation thereof.
Figure 3:
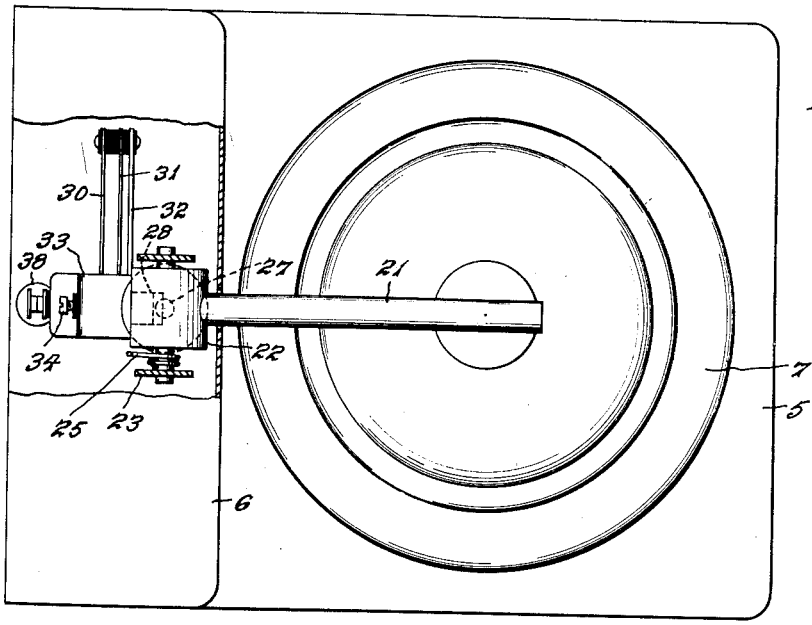
Fig. 3 is a plan view, partly in horizontal section, of a portion of said heater.
Figure 4:
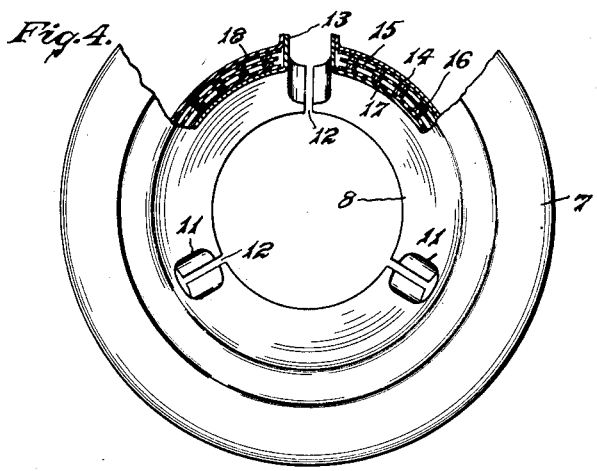
Fig. 4 is a plan view of the heating element, partly in section on line 4—4 of Fig. 1.

My invention further provides a mechanism for automatically controlling the said heating element to cause it to become deenergized when the material within the container 10 has been heated to a predetermined temperature. This mechanism preferably includes a tubular arm 21 which has a hub 22 by means of which it is pivotally mounted on a bracket 23 that is secured to the rear portion 6 of the heater base. This lever carries, at its outer end, a cover 24 which fits over the top of the container 10 and closes said container during a heating operation. A suitable spring 25 normally urges the lever to swing in an upward direction so as to lift the cover off the container as illustrated in Fig. 2.

A solenoid 26 is provided for controlling the operation of the lever 21 and the said solenoid has a plunger 27 which is normally urged, by spring means not shown, to engage a detent 28 on the hub 22 and retain the arm 21 in its downward position, against the tension of the spring 25, and the cover 24 in covering position upon the cup 10.

The hub 22 carries an electric switch 29 which controls the solenoid 26 and includes a stationary blade 30 and a movable blade 31. These blades are insulated from each other and carried on an extension 32 from a bracket 33 that is mounted upon the hub 22. An adjustment screw 34 is insulated from and carried by the bracket 33 to adjustably position the stationary blade 30 so as to vary the distance between the contact on said blade and the contact on the movable blade 31 and thereby provide an adjustment for varying the temperature to which the material in the container is to be heated before the operation of the said switch 29.

The arm 21 has a tubular projection 35 which extends downwardly through the cover 24 and into the container 10. A thermally responsive member, in the form of a bi-metallic bar 36, is secured to the lower end of said projection which is sealed to prevent the entry of liquid or moisture into the interior of the said projection and the extension 21.

The bi-metallic bar 36 extends upwardly into the interior of the tubular arm 21 and is connected to an operating bar 37 which is longitudinally movable in said extension and operates the movable blade 31 of the switch 29.

A main electric switch 38 is carried upon a bracket 39, which also supports the solenoid 26. This switch controls the heating element and, through the switch 29, also the solenoid 26 and has a movable blade 40 that is operated by a finger 41, which extends from the bracket 33, so as to open the said switch.

The operation of my improved heater is as follows: The material which is to be heated is first placed in the container 10 and the said container is then inserted into the inner shell 8 of the heating element and pressed lightly so that the tapered walls of the said containers are in close contact with the walls of the inner shell to thereby establish efficient heat conducting relation between the heating element and the material in the container.

The cover 24 is then swung downwardly into position to cover the container 10 and this causes the plunger 27 to engage the detent 28 and retain the cover in closed position. At the same time, the finger 41 will engage the blade 40 of the switch 38 and cause said switch to close; thereby closing the electric circuit to the heating element and energizing it.

As the material within the container 10 is heated, the bi-metallic bar 36 will flex and, through the operating bar 37, move the movable blade 31 of the switch 29 towards the stationary blade 30. When the material in the container has been heated to the temperature for which the said switch was adjusted by the screw 34, the contacts on the blades 30 and 31 will engage and close the electric circuit to the solenoid 26 and thereby energize said solenoid and cause the plunger 27 to retract and release the detent 28. The arm 21 will then swing upwardly, into the position shown in Fig. 2, under the influence of the spring 25; whereupon the finger 41 will release the blade 40 and cause the main switch 38 to open and thereby break the electric circuit to the heating element and de-energize the said element and also the solenoid.

The upward movement of the arm 21 will cause the cover 24 to be raised away from the container 10, to the position shown in Fig. 2, so as to uncover the container and thereby also rendering a signal indicating that the material has been heated to the predetermined temperature. If desired, the container may then be removed from the heater.

Figure 5:
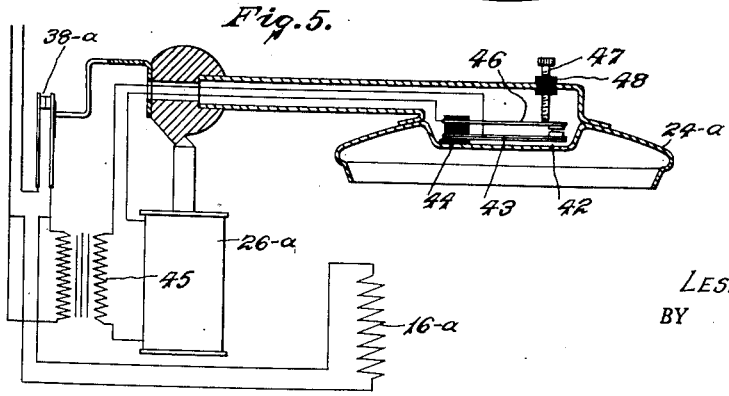
Fig. 5 is a sectional side view of a modified form of my invention with the electric circuit therefor being shown diagrammatically.

In the modified form shown in Fig. 5, a thermally responsive electric switch is located in a recess 42 in the top of the cover 24-a. This switch consists of a thermostatic bar 43 which is mounted on an insulating block 44 in heat conducting relation with the bottom of the recess 42, so that the said thermostatic bar will be responsive to temperature changes within the container cup.

The said switch preferably controls the electric circuit which extends from the secondary coil of a transformer 45 for energizing the solenoid 26-a that is controlled by means of the main switch 38-a which also controls the electric heating resistance 16-a.

In the said modified form, the bar 43 will flex upwardly as the temperature within the container rises. When the predetermined temperature is reached, the said bar will contact the stationary bar 46 of the switch and close the electric circuit and thereby cause the solenoid 26-a to be energized and the cover to be raised. The main switch will then open and cause the heating element and the solenoid to be de-energized in the same manner as above described.

If desired, a temperature adjusting screw 47 may be provided for adjustably positioning the bar 46 in order to vary the operation of the bar 43 for different desired temperatures; the said screw being insulated by means of an insulating sleeve 48 as shown.

I claim:

1. An electric heater comprising a base, a heating element supported on said base, a container heated by said element, a pivotally mounted arm, a cover carried by said arm and movable into covering and uncovering positions relatively to the container, means normally biasing said cover towards uncovering position, a detent, means engageable with said detent for retaining the cover in covering position, a thermally responsive device including a member extending below said cover into the container and responsive to the temperature therein, means including an electric switch operable by said thermally responsive member for causing disengagement of the detent and raising of the cover to its uncovering position, a separate electric switch controlling the heating element, and an operating finger carried by said arm and adapted to operate said separate switch to de-energize the heating element upon the movement of the cover to its uncovering position.

2. An electric heater comprising a base, a heating element supported on said base, a container removably positioned to be heated by said heating element, an arm pivotally mounted upon a portion of said base, a cover carried adjacent the free end of the said arm and adapted to cover said container, means normally biasing said arm to raise said cover away from the container, a detent on said arm, a member engageable with said detent for retaining the arm in lowered position and the cover in covering position against the tension of the biasing means, a solenoid for operating said member to cause disengagement of the detent and thereby permit the raising of the cover, thermally responsive means extending below said cover into the container and responsive to temperature changes therein, an electric switch operable by said thermally responsive means for controlling said solenoid, a separate switch for controlling the heating element, and a projection on said arm for opening said separate switch when the cover is raised to its uncovering position.

3. An electric heater comprising a base having an upright portion, a heating element supported on said base, a container detachably connected to said heating element for the heating of material in said container, an arm pivotally mounted upon said upright portion, a cover carried by said arm and movable to raised and lowered positions relatively to the container, spring means normally urging the arm to move the cover to raised position, a detent on said arm, a member engageable with said detent for retaining the cover in lowered position against the tension of the spring means, a solenoid for causing said member to release the detent, an electric switch for energizing said solenoid, a thermally responsive element subjected to heat within the container and operable to close said switch to cause release of the detent and raising of the cover upon a predetermined temperature having been reached within the container, a separate switch for controlling the heating element, and an operating finger carried by said arm and adapted to open said separate switch and cause de-energization of the heating element when the cover is moved to raised position.

4. An electric heater comprising a base, a heating element on said base, a container removably positioned to be heated by said heating element, an arm pivotally mounted upon a portion of said base, a cover carried by said arm and adapted to cover the container, means normally biasing said arm to raise the cover away from the container, a detent on said arm, a member engageable with said detent for retaining the arm in lowered position and the cover in covering position against the tension of the biasing means, a solenoid for operating said member to cause disengagement of the detent and thereby permit the raising of the cover, thermally responsive means extending from the cover into the container and responsive to temperature changes therein, an electric switch operable by said thermally responsive means to cause energization of said solenoid and disengagement of the detent upon the container being heated to a predetermined temperature, a main switch for controlling the heating element and the said solenoid, and means on said arm for causing opening of said main switch when the cover is raised to its uncovering position to thereby de-energize the heating element and the solenoid.

5. An electric heater including an electric circuit, a heating element in said circuit, a container positioned to be heated by said heating element, an arm pivotally mounted relatively to said container, a cover carried by said arm and adapted to cover said container, means normally biasing said cover away from the container, a detent on said arm, a member engageable with said detent for retaining the arm in lowered position and the cover in covering position against the tension of the biasing means, a solenoid in said circuit and in parallel with the heating element for operating said member to cause disengagement of the detent and thereby permit the raising of the cover, thermally responsive means responsive to temperature changes in said container, a normally open electric switch in said circuit and in series with said solenoid and adapted to be closed by said thermally responsive means for causing energization of said solenoid upon the said container being heated to a predetermined temperature, a main switch in said circuit and in series with said heating element and solenoid, and means carried by said arm for opening said main switch and thereby de-energizing the heating element and the solenoid when the cover is raised to its uncovering position.

6. An electric heater comprising a base, a heating unit supported on said base and including an inner shell having a flange resting upon the base and an inwardly and downwardly tapered annular wall depending from said flange through an opening in the base, the said depending wall having slots therein to render the wall laterally yieldable, an electrical heating element resistance secured to the exterior of said tapered wall, an outer sleeve surrounding said heating element, a container detachably connected to said heating unit and having a tapered wall adapted to fit within the wall of the said inner shell and snugly engage the inner surface thereof to provide close heating contact between said container and the heating element.

7. An electric heater comprising a base, a heating unit supported on said base and including an inner shell having a flange resting upon the base, and an inwardly and downwardly tapered annular wall depending from said flange through an opening in the base and adapted to receive a tapered container in close heat conducting contact therein, the said wall having spaced slots therein extending to the free edge thereof for rendering the wall outwardly yieldable to prevent binding of the container in said inner shell, a heating element including a plurality of electrical resistances each disposed against the outer surface of the inner wall between adjacent slots, an outer shell surrounding said heating element and having slots therein in register with the slots of the inner shell, and flanges extending perpendicularly along the edges of said slots and across the space between said shells and securing said shells together.

8. An electric heater comprising a base, a heating element supported on said base, a container heated by said heating element, an arm pivotally mounted on said base, a cover for said container carried by said arm, means normally urging said arm to move the cover to uncovering position relatively to the container, a detent on said arm, a member engageable with said detent for holding the cover in covering position relatively to the container, a solenoid for operating said member to release the detent, a thermally responsive electric switch contained within a recess in said cover and responsive to temperature changes in the container for causing energization of the solenoid for releasing the detent and permitting the cover to be moved to uncovering position, and a main switch operable upon the movement of the cover to uncovering position to cause de-energization of the solenoid and the heating element.

References Cited in the file of this patent

UNITED STATES PATENTS

| | | |
|---|---|---|
| Re. 16,908 | Rittman | Mar. 20, 1928 |
| 819,650 | Harden | May 1, 1906 |
| 1,414,494 | Arntfield | May 2, 1922 |
| 2,102,342 | Walder | Dec. 14, 1937 |
| 2,158,133 | Lemp | May 16, 1939 |
| 2,526,447 | Aiken | Oct. 17, 1950 |

FOREIGN PATENTS

| | | |
|---|---|---|
| 10,542/27 | Australia | Nov. 23, 1927 |